No. 828,152. PATENTED AUG. 7, 1906.
L. K. VALE, Jr.
CUSPIDOR.
APPLICATION FILED FEB. 13, 1906.
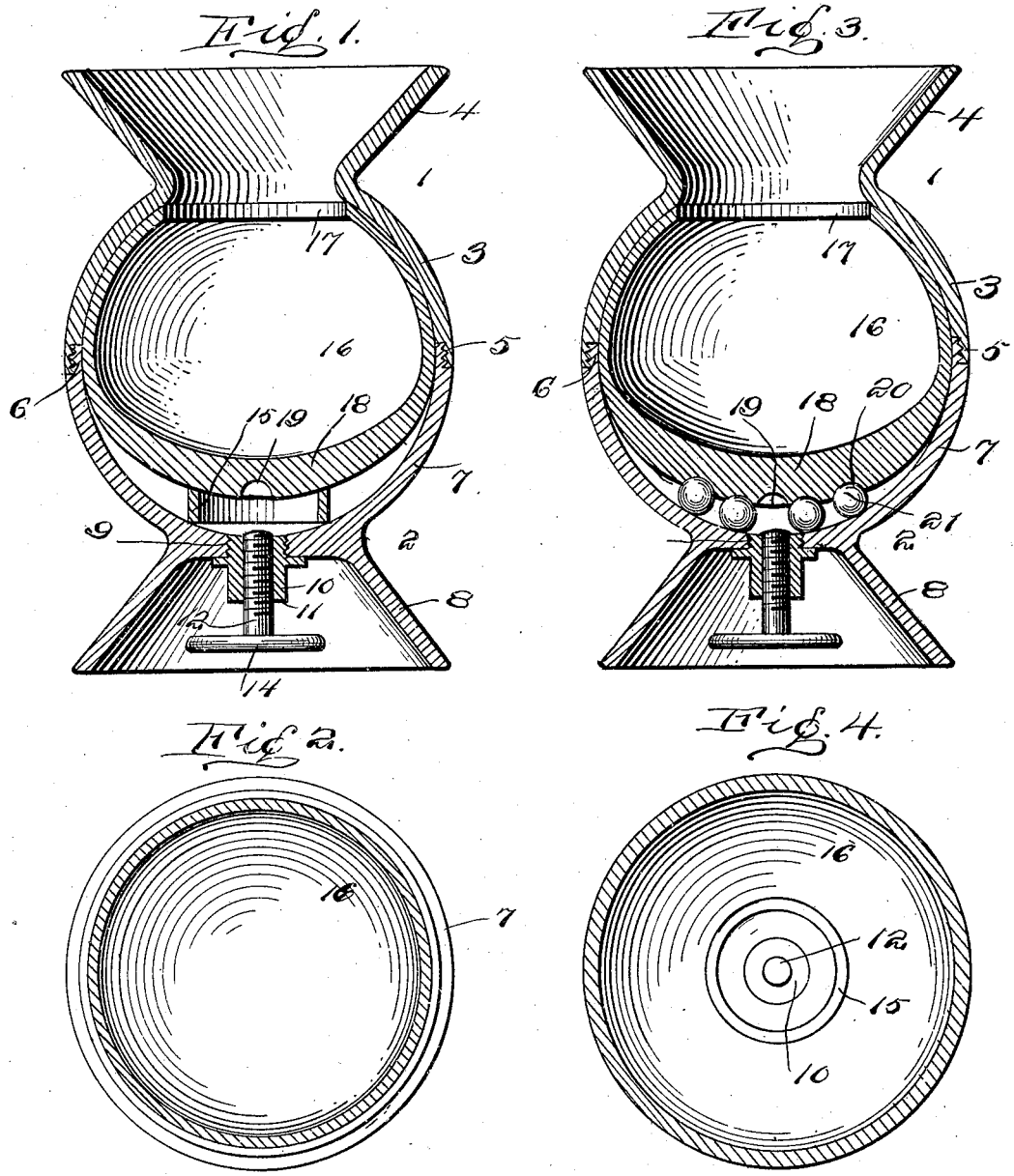
Witnesses
Samuel T. Payne.
E. E. Potter.
Inventor
L. K. Vale Jr.,
by N. C. Evert & Co.
Attorneys

UNITED STATES PATENT OFFICE.

LOUIS K. VALE, JR., OF McKEES ROCKS, PENNSYLVANIA.

CUSPIDOR.

No. 828,152.      Specification of Letters Patent.      Patented Aug. 7, 1906.

Application filed February 13, 1906. Serial No. 300,841.

*To all whom it may concern:*

Be it known that I, LOUIS K. VALE, Jr., a citizen of the United States of America, residing at McKees Rocks, in the county of Allegheny and State of Pennsylvania, have invented certain new and useful Improvements in Cuspidors, of which the following is a specification, reference being had therein to the accompanying drawings.

This invention relates to certain new and useful improvements in cuspidors; and the invention has for its primary object to provide a non-spillable cuspidor, which will be extremely simple in construction, strong and durable, and comparatively inexpensive to manufacture.

Another object of this invention is to provide a cuspidor that can be easily cleansed and kept in a perfectly sanitary condition.

Briefly described, my improved cuspidor comprises a two-part casing in which a receptacle is revolubly mounted, the receptacle being weighted, whereby its opening will be normally maintained in the line of gravitation, whereby its contents will not be precipitated should its casing be tilted or upset. In connection with the casing of the cuspidor I employ novel means for locking the receptacle thereof in a fixed position, whereby the opening of said receptacle will be held in alinement with the opening of the casing, thus permitting of the cuspidor being emptied at any desired time.

The detail construction entering into my invention will be hereinafter more fully described and claimed, and, referring to the drawings accompanying this application, like numerals of reference designate corresponding parts throughout the several views, in which—

Figure 1 is a vertical sectional view of my improved cuspidor. Fig. 2 is a cross-sectional view of a receptacle thereof, illustrating the lower part of the cuspidor-casing in plan. Fig. 3 is a vertical sectional view of my improved cuspidor, illustrating a slightly-modified form of construction; and Fig. 4 is a cross-sectional view of the lowermost part of the casing, illustrating the receptacle thereof removed.

To put my invention into practice, I construct my improved cuspidor of a casing consisting of an upper part 1 and a lower part 2. The upper part 1 consists of a semispherical portion 3, having a funnel-shaped top 4. The lower edges of the upper part 1 are interiorly screw-threaded, as at 5, to engage the screw-threaded edges 6 of the lower part 2. The lower part 2 also consists of a semispherical portion 7, having a cone-shaped base 8, which is adapted to support a cuspidor in its entirety and prevent the same from easily tilting or upsetting. The semispherical body 7 of the lower part of the casing 2 is provided with a bottom or web having a central screw-threaded opening 9, in which is mounted a flanged sleeve 10, having a central screw-threaded bore 11. In the sleeve 10 is mounted a set-screw 12, having a hand-wheel or handle 14, whereby the screw can be rotated. The bottom of the semispherical portion 7 of the part 2 is provided with an annular ring or band 15, the object of which will be presently described.

When the parts 1 and 2 are secured together, a substantially spherical receptacle 16 is mounted in the semispherical portions 3 and 7 of the parts 1 and 2. The receptacle 16 is formed with an opening 17 and has its bottom weighted, as at 18. The bottom of the receptacle 16 is adapted to rest upon the ring or band 15 of the casing, and centrally of the bottom is provided a recess 19, into which the upper end of the screw 12 is adapted to engage when the opening 17 of the receptacle 16 is to be held in alinement with the funnel-shaped top 4 of the casing. In Fig. 3 of the drawings I have illustrated a slightly-modified form of construction wherein the weighted bottom 18 of the receptacle 16 is provided with recesses 20, and engaging in said recesses are ball-bearings 21, which rest upon the bottom of the semispherical portion 7 of the casing. The ball-bearings 21 are adapted to facilitate the movement of the receptacle 16 within the casing when the cuspidor is accidentally tilted or upset.

The normal position of the cuspidor illustrated in Fig. 1 of the drawings permits of a person expectorating within the receptacle 16 or depositing any waste therein. Should the cuspidor be accidentally tilted or upset, the weighted bottom 18 of the receptacle 16 will maintain the opening 17 of said receptacle in the line of gravitation irrespective of its casing, thus preventing the contents of the receptacle 16 from being precipitated upon the floor or foundation supporting the cuspidor.

When it is desired to empty the cuspidor, the screw 12 is rotated into engagement with the bottom 18 of the receptacle 16 to maintain the opening 17 of the receptacle 16 in alinement with the funnel-shaped top 4 of the cuspidor, thereby permitting of its contents being easily ejected or discharged from the cuspidor.

In order that the receptacle 16 can be mounted within its casing, the casing has been made in two parts, this construction also facilitating the cleaning of the entire structure of the cuspidor.

I preferably construct my improved cuspidor of strong and durable metal, which may be suitably ornamented or embossed to present a neat and attractive appearance, and while I have herein illustrated the preferred shape of the cuspidor I do not care to confine myself to the specific contour of the same shown, and such changes as are permissible by the appended claim may be resorted to without departing from the spirit and scope of the invention.

What I claim, and desire to secure by Letters Patent, is—

A cuspidor comprising a two-part casing embodying an upper part having a semicylindrical body provided with a funnel-shaped top, a lower part having a semicylindrical body threaded at its upper end to the lower end of the upper part, and having a flaring base, an inwardly-extending web carried by said lower part at the junction of the semicylindrical body with the flaring base, a bearing resting on said web, a bowl having a weighted bottom resting on said bearing and having a mouth, a sleeve fitted in said web of the lower part and having a threaded bore, and a screw mounted in said bore and adapted when screwed inward to engage a notch in the base of the bowl and hold said bowl stationary.

In testimony whereof I affix my signature in the presence of two witnesses.

LOUIS K. VALE, JR.

Witnesses:
   WM. C. HEITZ,
   E. E. POTTER.